D. G. SMITH.
Car Truck.

No. 12,036. Patented Dec. 5, 1854.

UNITED STATES PATENT OFFICE.

DAVID G. SMITH, OF CARBONDALE, PENNSYLVANIA.

RUNNING-GEAR OF RAILROAD-CARS.

Specification of Letters Patent No. 12,036, dated December 5, 1854.

*To all whom it may concern:*

Be it known that I, DAVID G. SMITH, of Carbondale, Luzerne county, State of Pennsylvania, have invented a new and Improved Mode of Constructing Railroad-Car Wheels and Trucks.

The nature of my invention consists in attaching a pair of conical wheels, with an axle moved by connecting rods, to the ordinary truck for the purpose of enabling the car to pass around curves with greater facility, and with less liability to fracture of axles and other accidents.

Figure 1:
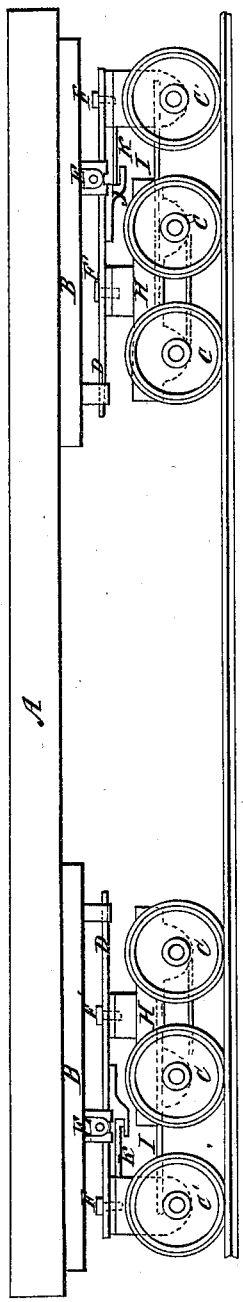
Figure 2:
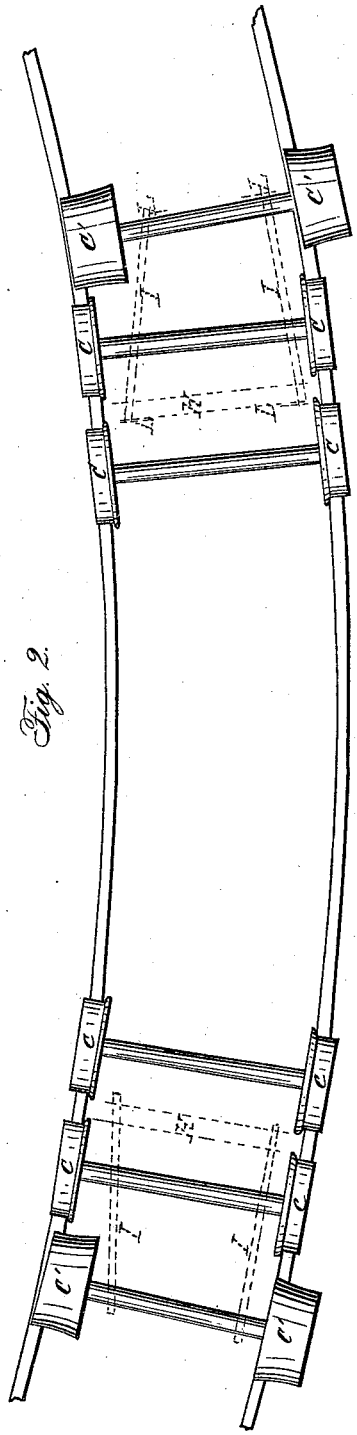

To enable others skilled in the art to make and use my invention I will proceed to describe its construction and operation, reference being had to the annexed drawings forming part of this specification; in which, Figure 1 is a side view of a car frame having my improvement attached. Fig. 2 is a vertical and sectional view of a truck passing around a curve.

Similar letters refer to like parts.

A, bottom frame of car; B, truck-frame; C, ordinary car wheels; C', conical wheels; D, connecting plate; E, bearing between connecting-plate and truck frame; FF', king bolts; H, cross piece of truck frame; I, connecting rods; J, supporting piece for K; K, circular guide; L, pin for holding connecting rod.

On the drawings the three axles are connected together by means of the connecting plates D, and the king bolts FF'. The king bolts permit the movement of the truck frames and enable the wheels to accommodate themselves to the track. The connecting plate D, is attached to the truck frame B, by means of bearings shown at E. It is at this point that the weight of the car is sustained, and as the bearings are midway between the conical wheels and the ordinary wheels, it is evident, that one half of the load will be borne by the conical wheels and one half by the other wheels.

The wheels C' are made in the common form on their outer ends, but from the middle to their inner edges, it will be noticed that they are of a conical form. The connecting rods I, extend from a cross bar placed midway between the ordinary wheels, to the axles of my improved wheels as shown in the various figures. These connecting rods I, do not run parallel with the frame work but converge a little as will be seen.

By reference to Fig. 2, it will be observed that this convergence, enables the conical wheels to accommodate themselves more perfectly to the track, than is the case with the ordinary wheels; it will also be noticed that the angles between the axles of the conical wheels, and the axles of the ordinary wheels are not the same.

When the car having my improvement attached approaches a curve, the conical wheel upon the outer track runs up so that the conical portion bears on the track, thus a greater diameter is given to the outer wheel in revolving, while the diameter of the inner wheel remains the same. It is therefore plain that the conical wheels will pass the curve with much greater ease than the ordinary wheels, and as the conical wheels are made to sustain one half of the entire weight of the car, the latter will move round the curve with much more safety, and less strain upon all the car axles than by the ordinary mode.

The connecting rods are fastened to the frame of the conical axles, by means of the pin L. The circular guides K and the supporting pieces J, are intended to give steadiness to the conical wheels.

I am not limited to this peculiar mode of imparting steadiness to my wheels; there are several other plans that might be adopted with equal success.

Having thus fully described the nature of my invention what I claim therein as new and desire to secure by Letters Patent is—

A six-wheeled truck, having on that end of it next the end of the car, a pair of wheels C', with semi-conical treads, and no flanges, (as represented), and united to the truck frame, which is also supported on two other pairs of wheels of the ordinary construction, by the supporting plate D, king-bolts F, F', and connecting rods I I—so that said pair of wheels C', may have a lateral motion on the rails, independent of the other pairs, and yet support their due proportion of the weight of the car, substantially in the manner, and for the purpose herein described.

DAVID G. SMITH.

Witnesses:
WILLIAM BALL,
JASPER B. STARK.